United States Patent [19]
Nafziger et al.

[11] 4,135,442
[45] Jan. 23, 1979

[54] NUT CRACKING MACHINE

[75] Inventors: Marvin L. Nafziger, Marietta, Ga.; John A. McMennamy, Manilla, Philippines

[73] Assignee: Sunnyland Farms, Inc., Albany, Ga.

[21] Appl. No.: 878,922

[22] Filed: Feb. 17, 1978

[51] Int. Cl.² ............................................. A23N 5/00
[52] U.S. Cl. ......................................... 99/582; 99/583; 241/283
[58] Field of Search .................. 99/568, 571, 572, 577, 99/581–583; 30/120–120.5; 241/283

[56] References Cited
U.S. PATENT DOCUMENTS

| | | | |
|---|---|---|---|
| 3,435,863 | 4/1969 | Dye | 99/583 |
| 3,524,486 | 8/1970 | Turner | 99/571 |
| 3,841,212 | 10/1974 | Powell | 99/581 |

*Primary Examiner*—Harvey C. Hornsby
*Assistant Examiner*—Timothy F. Simone
*Attorney, Agent, or Firm*—Newton, Hopkins & Ormsby

[57] ABSTRACT

A nut cracking machine particularly for cracking pecans enables faster and more reliable nut cracking with fewer machine adjustments and longer machine life. Air spring activation of the hammer mechanism and a cam operated hammer cocking and release mechanism render the machine more efficient and reliable. The structure facilitates manufacturing with economy.

10 Claims, 9 Drawing Figures

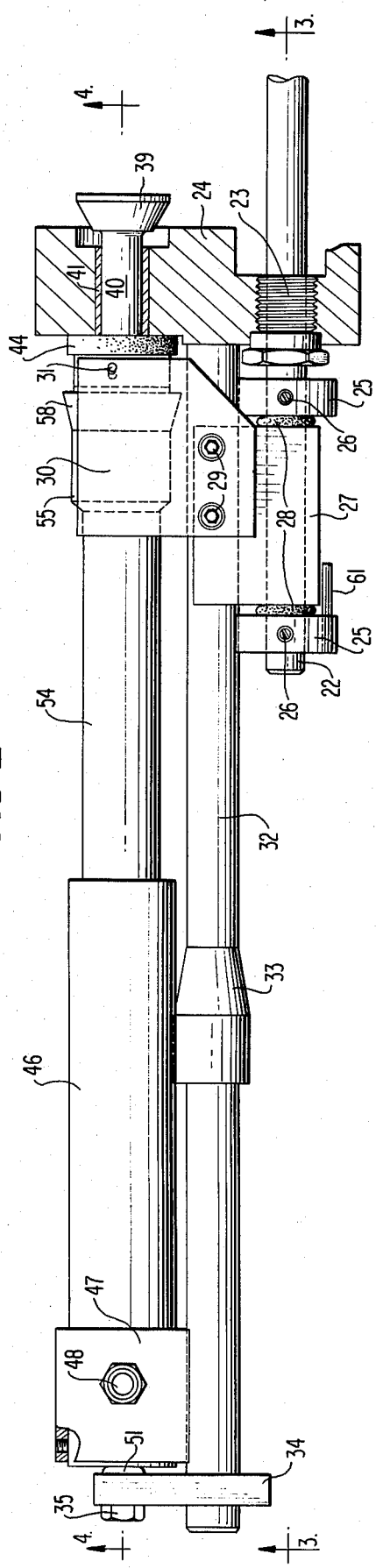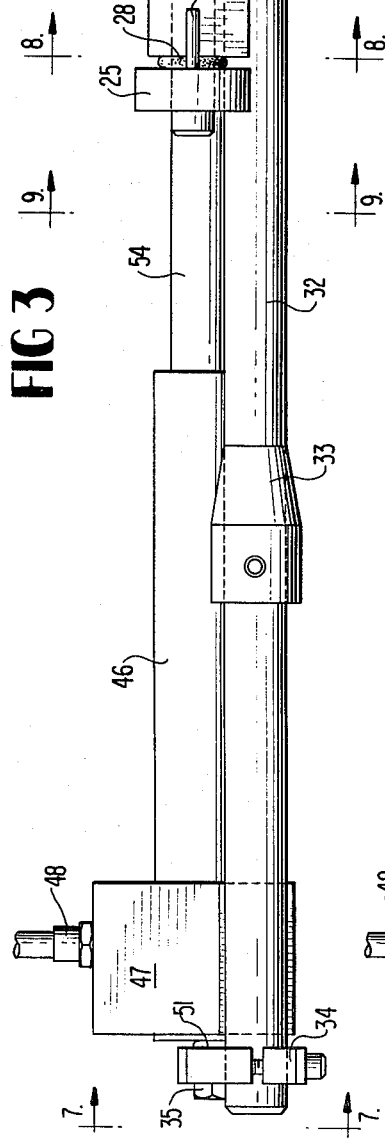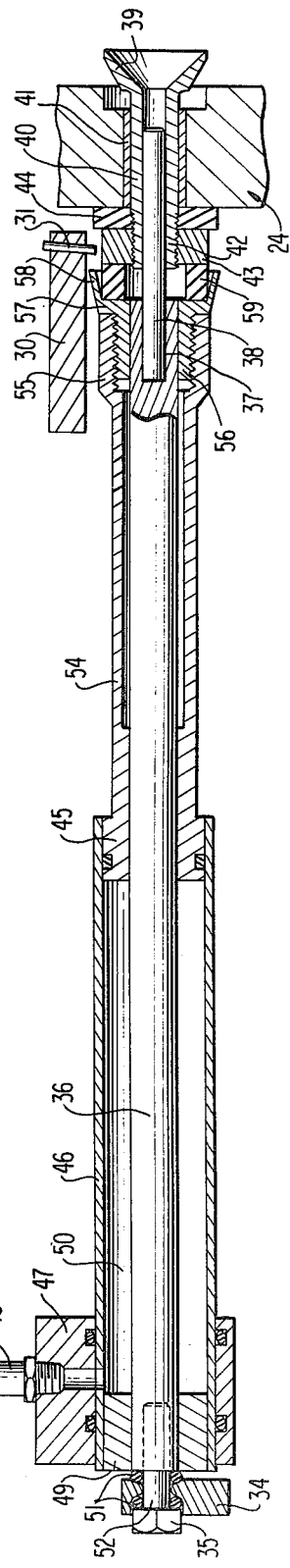

NUT CRACKING MACHINE

BACKGROUND OF THE INVENTION

Nut cracking machines of various forms are known in the prior art and some examples of the patented prior art are contained in the following U.S. Pat. Nos.: 2,707,503, 3,628,580, 3,159,194, 3,841,212, 3,561,513, 3,858,501.

The objective of the invention is to improve on the prior art machines in terms of reduced manufacturing costs, improved efficiency and reliability of operation, machine durability, negligible maintenance, reduced number of parts, and fewer adjustments.

The machine embodying the invention has a positive and very consistent cycle of operation which after initial adjustment requires practically no attention during long periods of continuous use. The simplicity of the mechanism and comparatively few sturdy parts involved in it renders it more practical and more economical to manufacture compared to the prior art.

Other features and advantages of the invention will become apparent during the course of the following description.

BRIEF DESCRIPTION OF THE DRAWINGS

FIG. 2 is an enlarged fragmentary plan view of the machine, partly in cross section.

FIG. 3 is a longitudinal vertical section taken on line 3—3 of FIG. 2.

FIG. 4 is a similar section taken on line 4—4 of FIG. 2.

DETAILED DESCRIPTION

Figure 1:
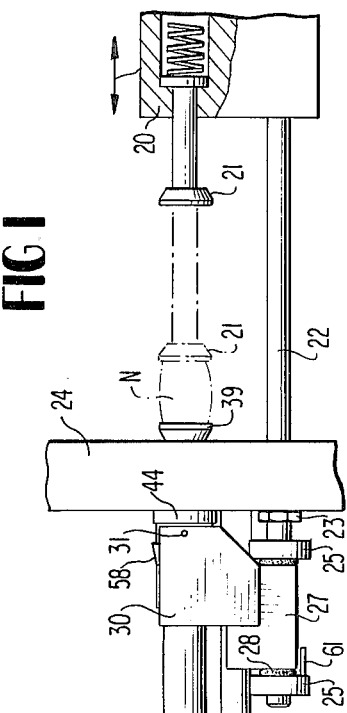
FIG. 1 is a plan view of a nut cracking machine embodying the invention.

Referring to the drawings in detail, wherein like numerals designate like parts, the numeral 20, FIG. 1, designates a cracking box having a spring-biased nut cracking die 21 extending forwardly thereof. The cracking box 20 is reciprocated longitudinally as shown by the arrow during the operation of the machine by any conventional mechanism, not shown. A longitudinal rod 22 rigid with the cracking box 20 extends forwardly thereof in spaced parallel relation to the axis of the cracking die 21. Referring to FIG. 3, the reciprocating rod 22 carried by the cracking box 20 is received through a guide bushing 23 in a stationary wall 24 of the machine.

Beyond the wall 24 the rod 22 has a pair of collars 25 rigidly secured thereto as by set screws 26. Between these collars, a block element 27 is mounted on the rod 22 for limited rotation and is held against movement axially of the rod by a pair of resilient spacer rings 28 interposed between the end faces of the block 27 and the collars 25. Rigidly secured to the top of block 27 as by screws 29 is a plate 30 carrying near its end closest to the cracking box 20 a fixed hammer cocking pin 31 which projects somewhat below the bottom face of the plate 30, as illustrated. The cocking pin 31 is disposed at a slight angle to the vertical, as shown, so that its lower end portion is more distant from the box 20 than its upper end. The plate 30 and pin 31 are reciprocated with the cracking box 20 and rod 22 during the operation of the machine, as will be further discussed.

Spaced somewhat laterally of the rod 22 and below it is a fixed parallel rigid bar 32 having a conical cam element 33 fixedly mounted thereon between the ends of the rod 32 and spaced a considerable distance from the wall 24. One end of the rod 32 is anchored in the wall 24 and its other end is rigidly held in a split clamp block 34, in turn fixedly attached at 35 to the adjacent end of another spaced parallel cylindrical rod 36 on the side of bar 32 away from the rod 22, FIG. 9, and at an elevation between the elevations of the elements 22 and 32. The rod 36 extends from the clamp block 34 toward the stationary wall 24, FIG. 4, and at its end nearest the wall 24 has a socketing recess 37 for a cylindrical pin 38 which pin projects forwardly of the adjacent end of the rod 36. A hammer actuated nut cracking die 39 in axial alignment with the die 21 of cracking box 20 has a tubular stem 40 extending through the bore of a guide bushing 41 mounted in an opening of the wall 24. The stem 40 has a rear screw-threaded extension 42 receiving an adjusting nut 43 rearwardly of the wall 24, FIG. 4, with a resilient washer 44 interposed between the wall 24 and the adjusting nut for cushioning the die 39. Thus, the cushioned die 39 is adjustably and fixedly mounted on the wall 24 and guided axially, both externally and internally, by the elements 41 and 38 so that it can move axially a slight distance when struck by hammer means, now to be described, in order to crack the nut held between the dies 21 and 39. It can be mentioned here that in the operation of the machine pecans are placed between the dies 21 and 39 automatically and in properly timed sequence by a conventional placement means, not shown.

The hammer means associated with the die 39 and its described support and guidance means comprises a reciprocatory piston head 45 having sliding engagement in a cylinder sleeve 46, which cylinder sleeve is fixed at its end away from the wall 24 to a head or block 47 having an inlet fitting 48 for compressed air from a remote source, not shown. An internal ring 49 closes the adjacent end of the cylinder sleeve 46 facing the piston head 45 to form a chamber 50 for compressed air between the elements 45 and 49, thus forming an air spring structure. Through the ring 49, the head 47 and fixed rod 36 are supportively interconnected. Preferably, the split clamp block 34 has a cushioned connection with the rod 36 by means of a pair of resilient rings 51 surrounding the shank 52 of bolt 35 and being intervened by an internal annular rib 53 of the collar 34.

Figure 5:
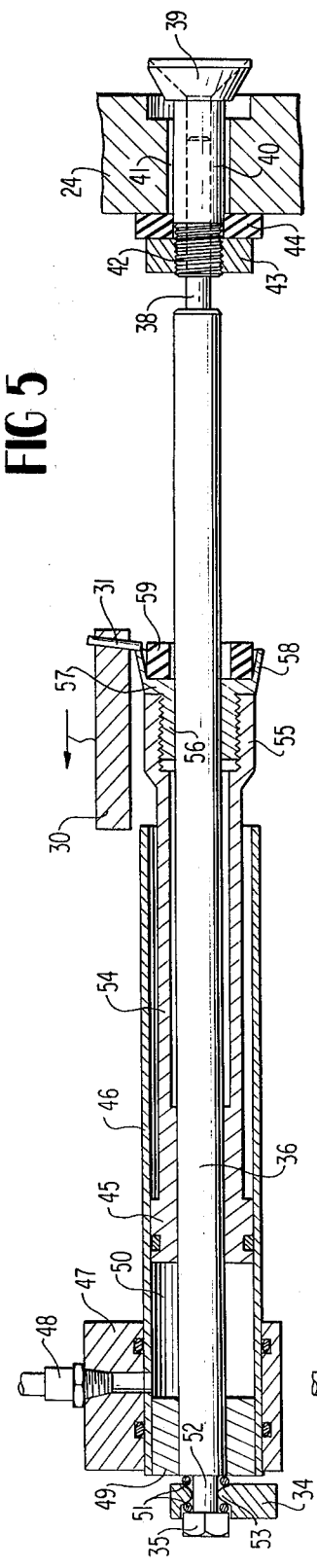
FIG. 5 is a view similar to FIG. 4 showing a hammer mechanism moving to a retracted position against a pneumatic spring.

The piston head 45 has a reduced diameter sleeve extension 54 which projects forwardly of the cylinder sleeve 46 and outside of this sleeve has an enlarged head 55 which is internally screw-threaded to receive the threaded tubular shank 56 of a hammer head 57 having a flared skirt or extension 58 projecting beyond the periphery of the head 55 so as to be in the path of movement of the cocking pin 31, FIG. 5. The hammer head 57 contains a preferably resilient hammer element or ring 59 fixed therein inside of the skirt 58 and projecting slightly forwardly thereof. The hammer element 59 is adapted to strike the back face of nut 43, FIG. 4, of cracking die 39 on each release of the hammer, as will be further described.

The entire piston assembly (45, 54, 55, 57, 58, 59) is positioned concentric to the cylinder sleeve 46 and guided in the longitudinal direction of motion by being closely fitted at its extreme longitudinal ends to rod 36.

Figure 6:
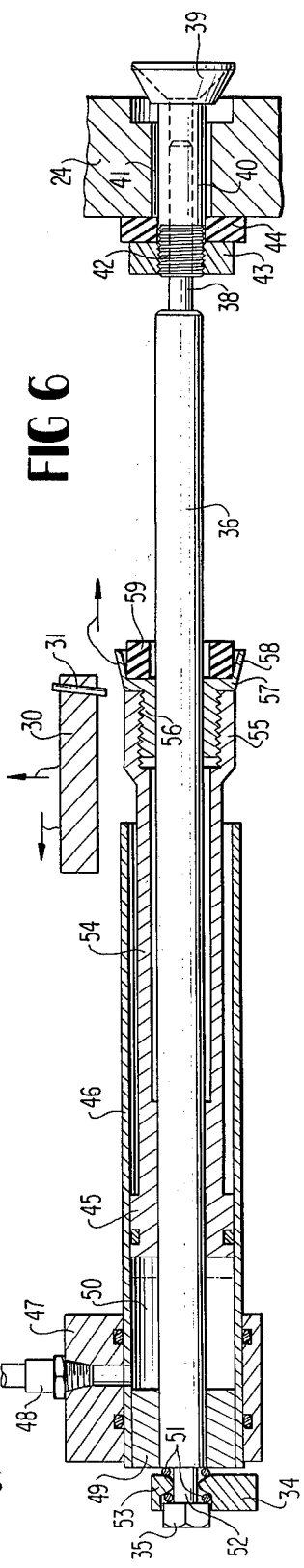
FIG. 6 is a view similar to FIG. 5 depicting the release of the hammer mechanism.
Figure 9:
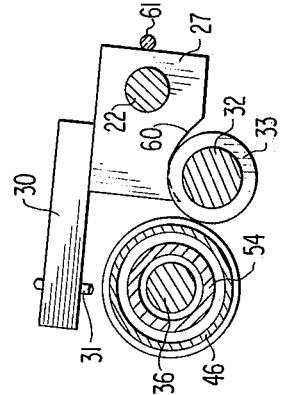
FIG. 9 is a similar section taken on line 9—9 of FIG. 3.
Figure 7:
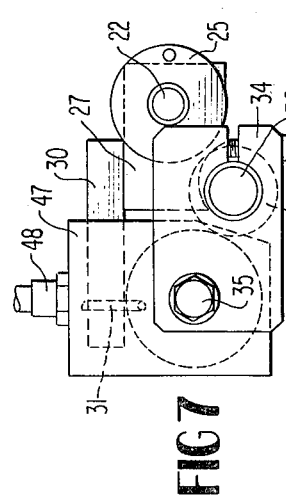
FIG. 7 is an end elevation of the machine taken on line 7—7 of FIG. 3.
Figure 8:
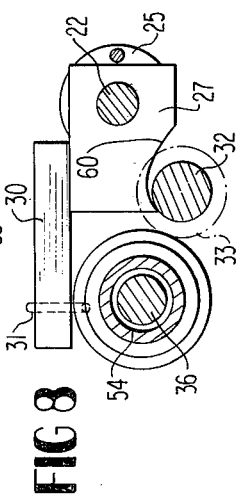
FIG. 8 is a transverse vertical section taken on line 8—8 of FIG. 3.

The block element 27 has a lower side arcuate face 60, FIG. 9, which rides along the stationary rod 32 during reciprocation, FIG. 8. During such engagement with the rod 32, the plate 30 is level and the cocking pin 31 is able to catch the front edge of flared skirt 58 so as to retract the hammer piston 45 in the manner shown in FIG. 5 and compress the air in the air spring chamber 50. When the arcuate surface 60 engages and rides up on the conical cam 33, as shown in FIG. 9, the block 27 and plate 30 are tilted upwardly clockwise around the axis of rod 22 and this disengages the cocking pin 31 from the flared skirt 58, as illustrated in FIG. 6. Instantly following this disengagement and release of the skirt 58 of hammer head 57, the hammer head flies forwardly along the rod 36 under the influence of air pressure in the air spring chamber 50 and the element 59 strikes the back face of nut 43 moving the die 39 axially forwardly toward the die 21 a sufficient slight distance to crack the nut N, FIG. 1, held by the two dies. The elastic washer 44 yields at this time sufficiently to produce the minute axially guided movement of the die 39 required to crack the nut. In practice, each nut is cracked in approximately $1 \times 10^4$ seconds.

With conventional means driving the cracking box 20 and its rod 22 in reciprocation, the cracking cycle of operation of the machine is continuous and repetitive and can be quite rapid. On each retraction of the plate 57 with cocking pin 31 to retract the hammer cylinder 45, a stop pin 61 carried by one of the collars 25, FIGS. 1 and 3, positively limits rotation of the block element 27 on the rod 22, as shown in FIG. 9. This prevents the plate 30 from flying too far in the clockwise direction under influence of the cam 33 in the rapidly moving mechanism. The plate 30 can return to the level position, FIGS. 5 and 8, by gravity. The machine is rapid, efficient and consistent in operation. It has the absolute minimum need for adjustment and maintenance. It is very strong the durable and well adapted to modern day manufacturing. Its advantages should now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A nut cracking machine comprising a fixed guide means, a reciprocatory means including a first nut cracking die and an extension member having guided engagement with said fixed guide means, an opposing hammer actuated nut cracking die on the fixed guide means coaxial with said first die and spaced laterally of said extension member, a reciprocatory stored energy driven hammer including a hammer guide member coaxial with said hammer actuated die, another guide member in laterally spaced parallel relation to the hammer guide member and said extension member and having a cam element intermediate its ends, the lastnamed guide member being secured to said fixed guide means, and a cocking and release device for said reciprocatory hammer mounted pivotally on said extension member and having a cam follower surface adapted to ride along said another guide member and to engage said cam element and be shifted by the cam element in a direction to release the reciprocatory hammer from its cocked stored energy position, whereby the hammer is then moved by the stored energy against said hammer actuated die.

2. A nut cracking machine as defined in claim 1, and said fixed guide means comprising a wall, said reciprocatory means including said first die disposed on one side of said wall, said reciprocatory hammer and hammer guide and said another guide member disposed on the opposite side of said wall, said hammer actuated die passing through a guide member in said wall and extending on both sides of the wall, said extension member having guided engagement through a guidance opening in said wall and said cocking and release device on said extension member being on the side of said wall remote from said first die.

3. A nut cracking machine as defined in claim 1, and said first die being spring-urged axially toward said hammer actuated die.

4. A nut cracking machine as defined in claim 1, and said hammer actuated die comprising a head having a tapered cavity to receive and seat one end of a nut, a tubular stem projecting rearwardly of said head and extending through a guide and support bushing in said fixed guide means, said stem being screw-threaded beyond the side of the fixed guide means remote from said head, an adjusting nut on the screw-threaded portion of said stem, and an elastic washer between said nut and said fixed guide means.

5. A nut cracking machine as defined in claim 1, and said reciprocatory stored energy driven hammer comprising a piston driven hammer on said hammer guide member, a cylinder receiving the piston of said hammer for reciprocation therein and having a compression chamber for a gaseous medium whereby retraction of said piston in said cylinder by said cocking and release device compresses said medium in said chamber thereby storing energy to drive the hammer toward the hammer actuated die.

6. A nut cracking machine as defined in claim 5, and said piston driven hammer having an impact element at its leading end coaxial with an impact element of said hammer actuated die.

7. A nut cracking machine as defined in claim 6, and a flared skirt element surrounding the impact element of said hammer and projecting radially thereof, said cocking and release device including a cocking pin adapted to catch said flared skirt element and retract said hammer during reciprocation of said means and said extension member and prior to engagement of the cocking and release device with said cam.

8. A nut cracking machine as defined in claim 1, and said cam element being conically tapered toward said fixed guide means, said cocking and release device having a bottom arcuate face engaging said another guide member slidably and adapted to ride up on said conically tapered cam element to thereby raise said cocking and release device to a release position.

9. A nut cracking machine as defined in claim 1, an said extension member of said reciprocatory means comprising a cylindrical rod having its axis parallel to the axis of said first die and spaced laterally therefrom, said cocking and release device comprising a block element rotatably mounted on said rod and including a plate extension projecting laterally of the rod and block element and across the axes of said hammer and said another guid member, and a fixed stop element on said rod near one side of the block element to positively arrest rotation of the block element in one direction responsive to the action of said cam.

10. A nut cracking machine as defined in claim 9, and a cocking pin for said hammer set at an angle in said plate extension and projecting below the bottom face thereof to catch a flared skirt element of the hammer for retracting the hammer, and said block element having an arcuate cam follower face in its lower side.

* * * * *